United States Patent
Nakata

(10) Patent No.: US 8,240,551 B2
(45) Date of Patent: Aug. 14, 2012

(54) DEVICE, METHOD AND PROGRAM FOR DETERMINING DENSITY OF BARCODE

(75) Inventor: Hiroaki Nakata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 12/760,711

(22) Filed: Apr. 15, 2010

(65) Prior Publication Data

US 2010/0301111 A1   Dec. 2, 2010

(30) Foreign Application Priority Data

May 26, 2009   (JP) .................................. 2009-126664

(51) Int. Cl.
*H04N 1/40* (2006.01)
*G06F 17/00* (2006.01)
(52) U.S. Cl. ...................... 235/375; 358/3.28
(58) Field of Classification Search .................. 235/375; 358/3.28

See application file for complete search history.

(56) References Cited

U.S. PATENT DOCUMENTS

| 5,873,735 A * | 2/1999 | Yamada et al. ............... 434/316 |
| 5,974,202 A * | 10/1999 | Wang et al. .................... 382/306 |
| 6,813,385 B2 * | 11/2004 | Ideyama ........................ 382/232 |

FOREIGN PATENT DOCUMENTS

JP   2001-346032   12/2001

* cited by examiner

*Primary Examiner* — Jamara Franklin

(74) *Attorney, Agent, or Firm* — Fitzpatrick, Cella, Harper & Scinto

(57) ABSTRACT

The accuracy of reading a barcode embedded in a printed document is maintained, and at the same time, the amount of toner and the like consumed is reduced. When document information read by scanning is analyzed and the density of the document information is higher than a predetermined threshold vale, that is, when the printed document has a space enough to contain the barcode, the density of the barcode is set such that the density of the barcode is decreased as compared with a case where the density of the document information is lower than the predetermined threshold value. By changing the size of dots and the distance between the dots and thus decreasing the density of the barcode, it is possible to reduce the amount of toner and the like consumed. Then, the set barcode is synthesized with the document information, and the synthesized image is output.

5 Claims, 9 Drawing Sheets

DEVICE, METHOD AND PROGRAM FOR DETERMINING DENSITY OF BARCODE

BACKGROUND OF THE INVENTION

1. Field of the Invention

The present invention relates to a device, a method and a program for determining the density of a barcode which is synthesized with an input image so as to form a pattern.

2. Description of the Related Art

In recent years, as MFPs (multifunction peripheral) have been widely used, a problem has arisen that confidential information leaks through printed documents. As a technology for preventing or reducing the leakage of confidential information, for example, the following method is proposed. In a method disclosed in Japanese Patent Laid-Open No. 2001-346032, a large number of barcodes are repeatedly synthesized over the entire surface of a document that is constituted by document information containing confidential information, and thus a printed document containing specific information as a pattern of a latent image is produced. This barcode contains inhibition information indicating the inhibition of the above printed document from being copied and tracking information for tracking a person (user who has instructed to print the document) who printed the document. This tracking information contains, for example, the ID of the user and the print time and date. With this inhibition information, the leakage of confidential information through copying is prevented; with the tracking information, the leakage of confidential information is reduced.

However, since the above-described barcode is added to the document information to be printed and is synthesized as a pattern over the entire document as described above, the printing of the barcode involves the consumption of a large amount of toner (toner is one example of consumable items and it goes without saying that ink or the like may be used instead). Accordingly, the present invention provides a device that accurately reads information contained in a barcode and that reduces the amount of toner and the like consumed.

SUMMARY OF THE INVENTION

According to the present invention, there is provided a device including: a setting component configured to set a density of a barcode; a synthesizing component configured to synthesize, with document information, the barcode whose density is set by the setting component; and an outputting component configured to output an image synthesized by the synthesizing component, wherein, when a density of the document information is higher than a threshold value, the setting component sets the density of the barcode lower than in a case where the density of the document information is lower than the threshold value.

According to the present invention, it is possible to perform a setting such that, when the density of the document information is high, that is, when a space in which the barcode is synthesized is small, the density of the barcode is increased whereas, when the density of the document information is low, that is, when the space in which the barcode is synthesized is large, the density of the barcode is decreased. By performing the setting in this way, it is possible not only to maintain the accuracy of reading information included in the barcode but also to reduce the amount of toner and the like consumed.

Further features of the present invention will become apparent from the following description of exemplary embodiments (with reference to the attached drawings).

BRIEF DESCRIPTION OF THE DRAWINGS

FIG. 7A is a diagram showing an example of the output of a barcode at a high density;

FIG. 7B is a diagram showing an example of the output of a barcode at a low density;

DESCRIPTION OF THE EMBODIMENTS

Preferred embodiments for practicing the present invention will be described below with reference to the accompanying drawings.

Embodiment 1

Figure 1:
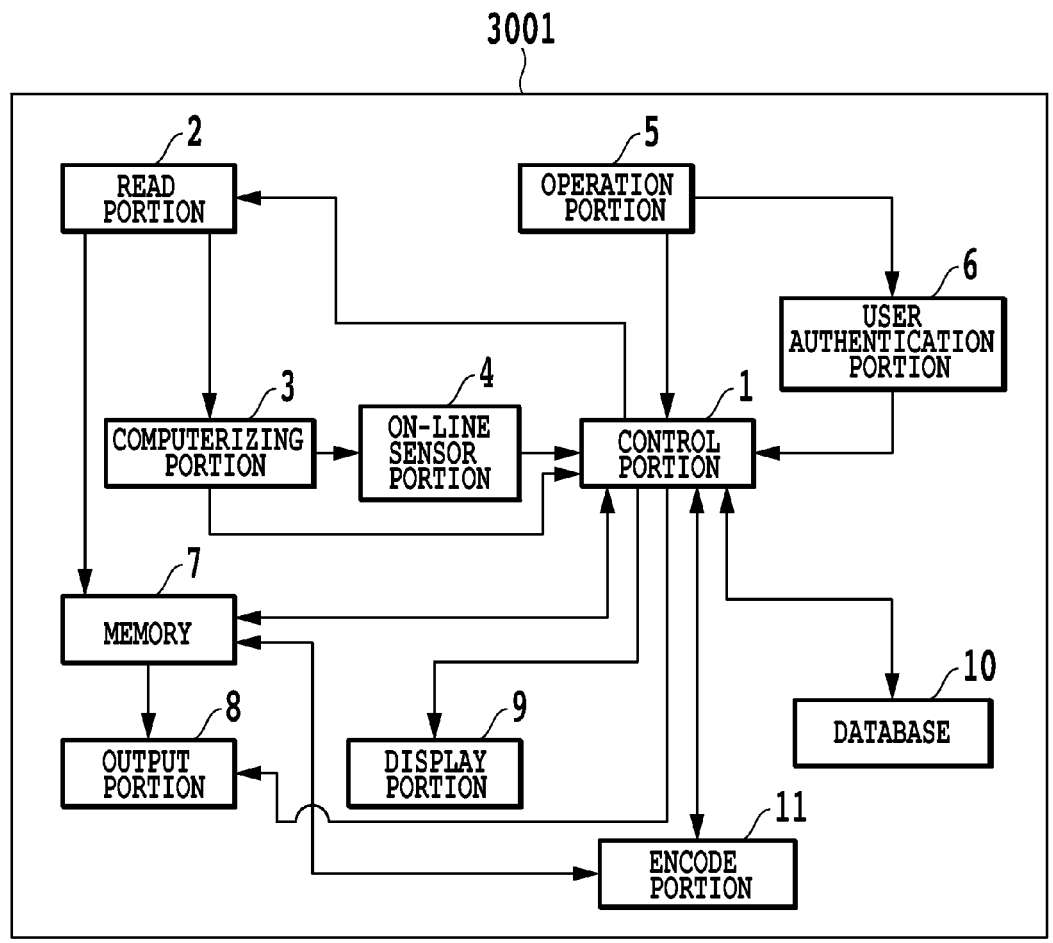
FIG. 1 is a block diagram of a MFP of a first embodiment.

FIG. 1 is a block diagram showing the configuration of an image forming device (an example of which is MFP 3001) of this embodiment. A control portion 1 is a central processing unit that controls the individual components of the MFP 3001 and that performs computation processing and the like; the control portion 1 performs various types of processing based on programs stored in a memory 7. An operation portion 5 accepts an operation/input from a user. The operation portion 5 can accept the operation/input through a user interface screen displayed on a display portion 9.

A user authentication portion 6 manages the authentication of the user who uses the MFP 3001. The user authentication is used when the user who has instructed to perform printing is tracked. A read portion 2 scans a printed document and generates document information. The document information refers to information on the printed document obtained by scanning it. With this document information, an output for printing is performed. The document information can contain not only information to be printed but also a barcode. A computerizing portion 3 computerizes the barcode contained in the document information generated by the read portion 2, and thereby acquires embedded information. Specifically, the computerizing portion 3 acquires a plurality of unit barcodes (an example of which is the data of scattered dots) contained in the document information, and performs a predetermined computation on the dot data to acquire the embedded information. The processing for computing the barcode will be described later. The embedded information refers to information contained in the document information as the barcode; the embedded information contains inhibition information (dot data) indicating the inhibition of copying and information (dot data) indicating tracking information for identifying the user who has instructed to perform printing. The tracking information contains useful information for identifying the printing person, such as the print time and date, the name of the user who has instructed to perform printing (namely the user ID) and the name of a device. An on-line sensor portion 4 decodes the embedded information obtained by the computerizing portion 3 to acquire the inhibition information and/or the tracking information that are on-line information. The inhibition information and/or the tracking information may be off-line information that is acquired without the need for a network. The memory 7 stores the document information obtained by the scanning in the read portion 2.

An output portion 8 reads image information from the memory 7, and then prints the image information or performs output such as the transmission of the image information to an external device. The image information refers to data that is generated based on the document information and that is expanded for printing. The processing for generating data for printing is conventionally performed, and thus its description will be omitted in this specification. The external device refers to, for example, a PC (personal computer), another MFP and the like connected with the MFP 3001 through a network. The display portion 9 is controlled by the control portion 1 to display a display screen. A database 10 records the setting of the MFP 3001 and a log. The database 10 may be formed integrally with the memory 7. An encode portion 11 encodes the inhibition information and/or the tracking information and thereby generates the embedded information that is synthesized with the printed document and is contained therein, and converts the embedded information into an image and thereby generates a barcode. As will be described later, when the decoding is performed, an error correction code is added, and then the inhibition information and/or the tracking information are encoded.

In the example of FIG. 1, the control portion 1, the memory 7, the operation portion 5 and the database 10 function as a setting component configured to set the density of the barcode. The control portion 1, the memory 7, the encode portion 11 and the database 10 function as a synthesizing component configured to synthesize the barcode with the document information. The control portion 1, the memory 7 and the output portion 8 function as an outputting component configured to output the synthesized image.

Figure 2:
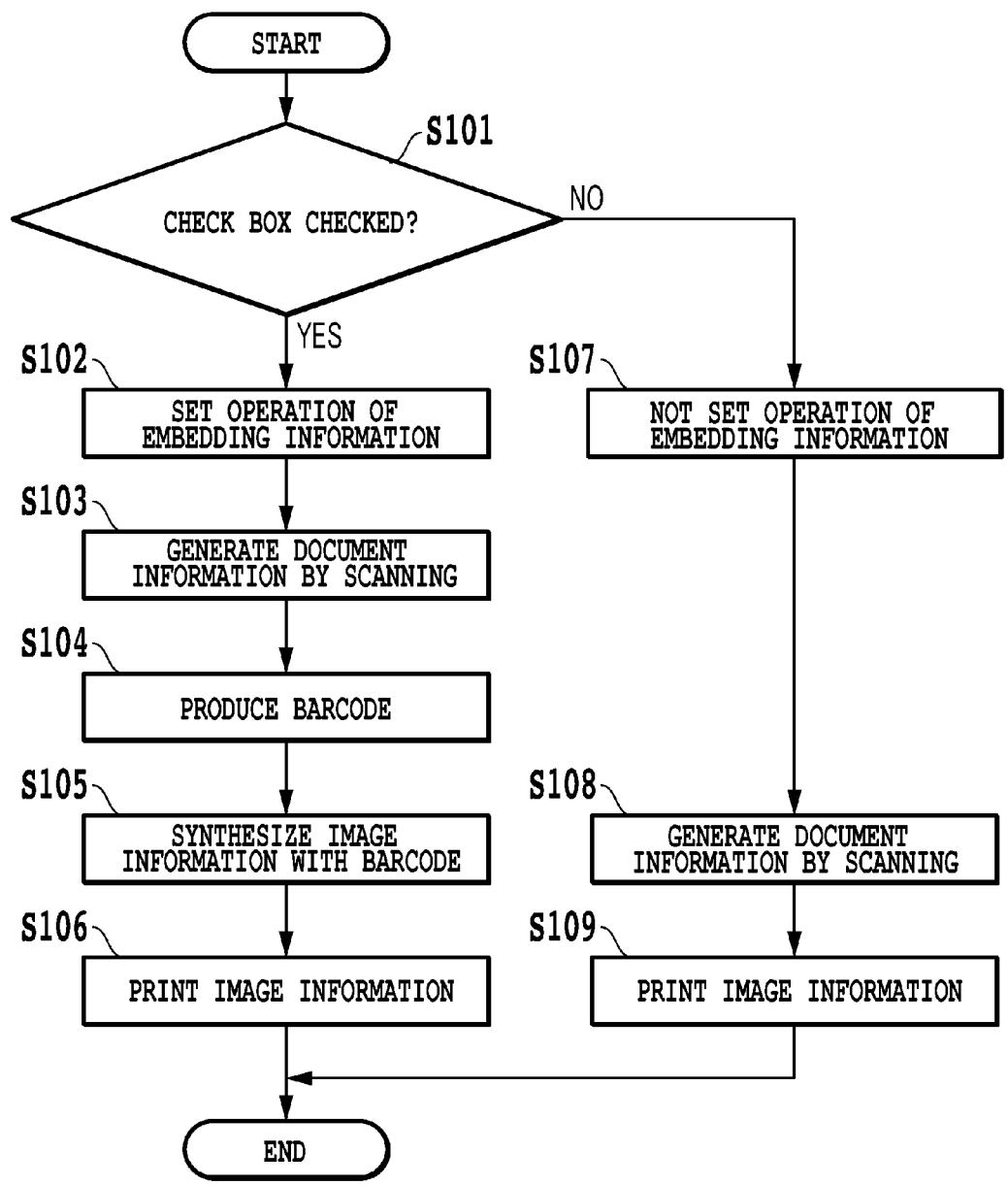
FIG. 2 is a diagram showing the summary of the operation of the MFP of the first embodiment at the time of printing.

The flow of the processing performed by the blocks of FIG. 1 will be described with reference to FIG. 2. With respect to the processing described below, the control portion 1 reads the programs stored in the memory 7 and outputs executive instructions to the individual portions shown in FIG. 1, and thereby performs the processing. First, as processing in the initial stage, while the user of the MFP 3001 is watching the setting screen of the display portion 9, the user inputs a user ID/password into the operation portion 5. Then, the input information is fed from the operation portion 5 to a user authentication portion 6, and the user authentication portion 6 determines whether or not the input password is an appropriate password. If the determination result shows that the password is an appropriate password, the user authentication portion 6 notifies the result and the user ID to the control portion 1. Then, the control portion 1 displays, on the display portion 9, a check box for inquiring whether to embed information. This check box is used for the user to input a determination as to whether or not the inhibition information and/or the tracking information are embedded (synthesized) as the barcode. After the display of the check box, when the user checks the check box through the operation portion 5 to provide an instruction to perform printing, the operation portion 5 notifies the instruction to the control portion 1. If the check box is not checked, the operation portion 5 notifies the result to the control portion 1. Alternatively, it is possible to set the embedding of the information through the driver of the PC connected to the MFP 3001 or a utility.

Based on the above-described processing in the initial stage, the processing will be described below with reference to FIG. 2. In step S101, the control portion 1 determines whether or not the check box for inquiring whether the embedding (synthesizing) of the information is performed is checked by the user. If the check box is checked, the process proceeds to step S102; if it is not checked, the process proceeds to step S107.

In step S102, the control portion 1 sets the operation for embedding the information, and notifies the setting and the user ID to the encode portion 11. Specifically, the control portion 1 sets whether or not to embed, when the printing output is performed, both or either of the inhibition information and the tracking information, and sets the information to be embedded (synthesized). This operation setting may be performed through the checking of another check box displayed on the display portion 9 by the user. Alternatively, the setting may be previously stored in the memory 7 of the MFP 3001.

Then, in step S103, the control portion 1 instructs the read portion 2 to scan the printed document. In step S103, the read portion 2 scans the printed document to produce the document information, and transmits it to the memory 7 and the computerizing portion 3. When the printed document already contains the barcode, the computerizing portion 3 and the on-line sensor portion 4 decode the barcode contained in the produced document information.

In step S104, the encode portion 11 encodes the inhibition information and the tracking information (including the user ID) to obtain the result of the encoding (embedded information), and converts the embedded information into an image to produce the barcode. The processing for producing the barcode in step S104 will be described in detail later. Then, the encode portion 11 transmits the produced barcode for use in the synthesizing to the memory 7.

Thereafter, when the control portion 1 detects that the memory 7 receives both the barcode and the document information, the process proceeds to step S105 where they are synthesized together in the memory 7 and thus the image information is generated. Then, in step S106, the control portion 1 outputs the generated image information from the memory 7 to the output portion 8 to make the output portion 8 print it. By performing the processing described above, the printed document with which the barcode is synthesized as a pattern is output.

If, in step S101, the check box is not checked, in step S107, the control portion 1 does not set the operation for embedding the information, and instructs the read portion 2 to scan the printed document. In step S108, the read portion 2 scans the printed document and thereby produces the document information, and transmits it to the memory 7. Thereafter, when the control portion 1 detects that the memory 7 receives the document information, the process proceeds to step S109 where the generated document information is transmitted as the image information from the memory 7 to the output portion 8 and the output portion 8 prints it. That is, a series of processing in steps S107 to S109 indicates normal copying processing for scanning a printed document and printing and outputting it.

Here, with reference to FIGS. 3 and 5, an example of a method of encoding the inhibition information and the tracking information and of converting the result of the encoding into an image to produce the barcode will be described.

Figure 5:
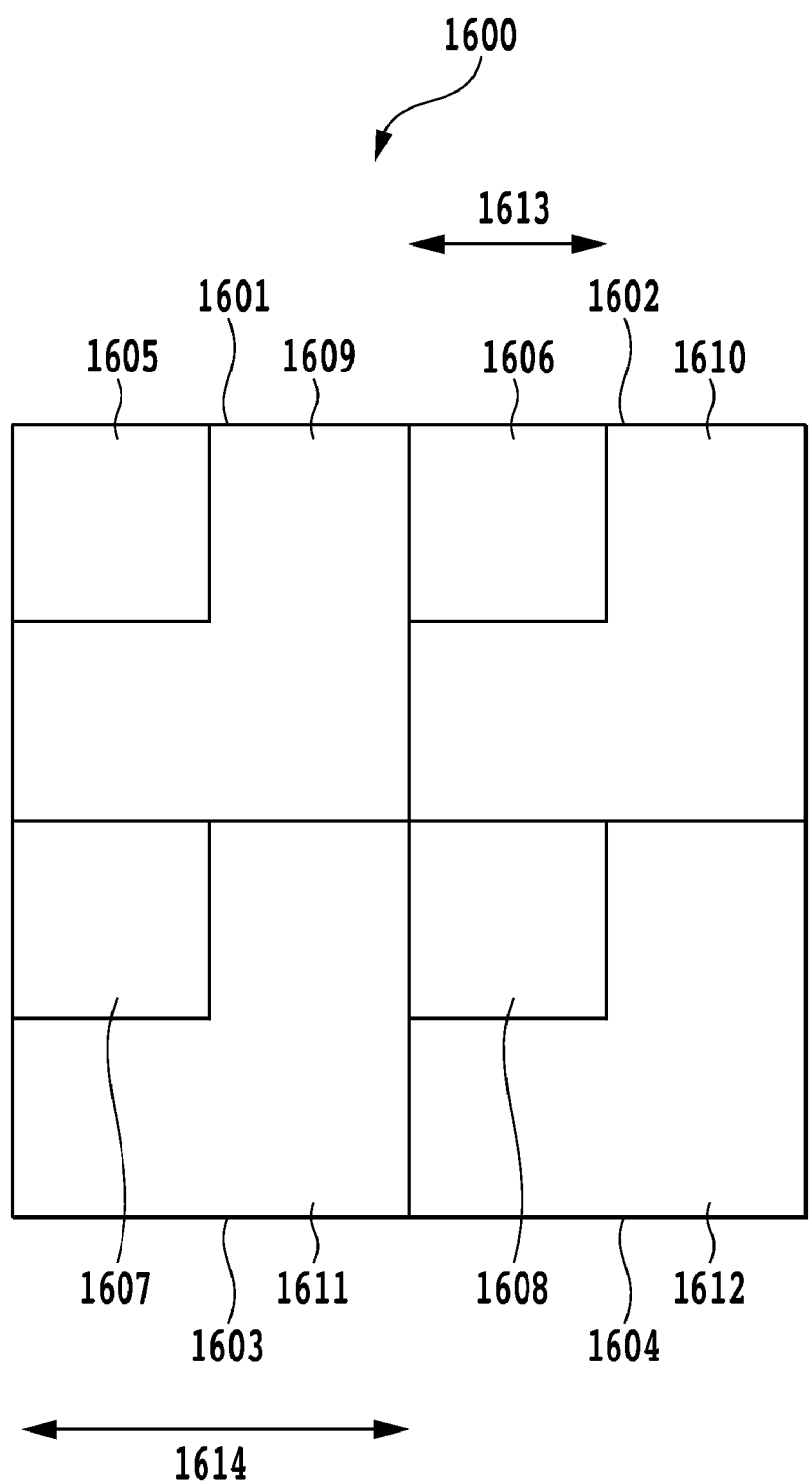
FIG. 5 is a diagram showing an example of the arrangement of a region where information is embedded.

FIG. 5 is a diagram for providing a supplementary description on the unit barcode 1600. The unit barcode 1600 measures about 1 cm by 1 cm, and is composed of high density regions 1605 to 1608 and low density regions 1609 to 1612.

The high density regions contain the result of the encoding of the inhibition information; the low density regions contain the result of the encoding of the tracking information. As compared with the low density regions, in the high density regions, a large number of error correction codes are used. This is because there is a concept that the inhibition information is more important than the tracking information. Although a large number of error correction codes are used, the region containing the inhibition information is smaller. This is because, in the inhibition information, a smaller amount of information is handled, and thus the size of data thereof is small.

The unit barcodes 1600 are repeatedly synthesized on the entire surface of the document information. For example, when the document information is printed on an A4 size (21 cm×29.7 cm) sheet, 21×29 unit barcodes are synthesized with the document information. In this way, 609 unit barcodes of the same information are synthesized on the one A4 size sheet. In this specification, all unit barcodes (609 unit barcodes) synthesized with the document information or a part of the unit barcodes is collectively referred to simply as a barcode. The barcode described in this specification is used so that a certain type of information is encoded, an image obtained by the encoding is synthesized with a printed document, the printing output is performed, thereafter the image synthesized with the printed document is read and decoded and thereby the certain type of information is restored. It is therefore necessary to consider the barcode described in this specification not to simply be a narrowly defined barcode such as a UPC (Universal Product Code) or a JAN (Japan Article Number). An encoded code (dot code) called a LVBC (Low Visibility Barcode) is one example of the barcode used in this specification.

Figure 3:
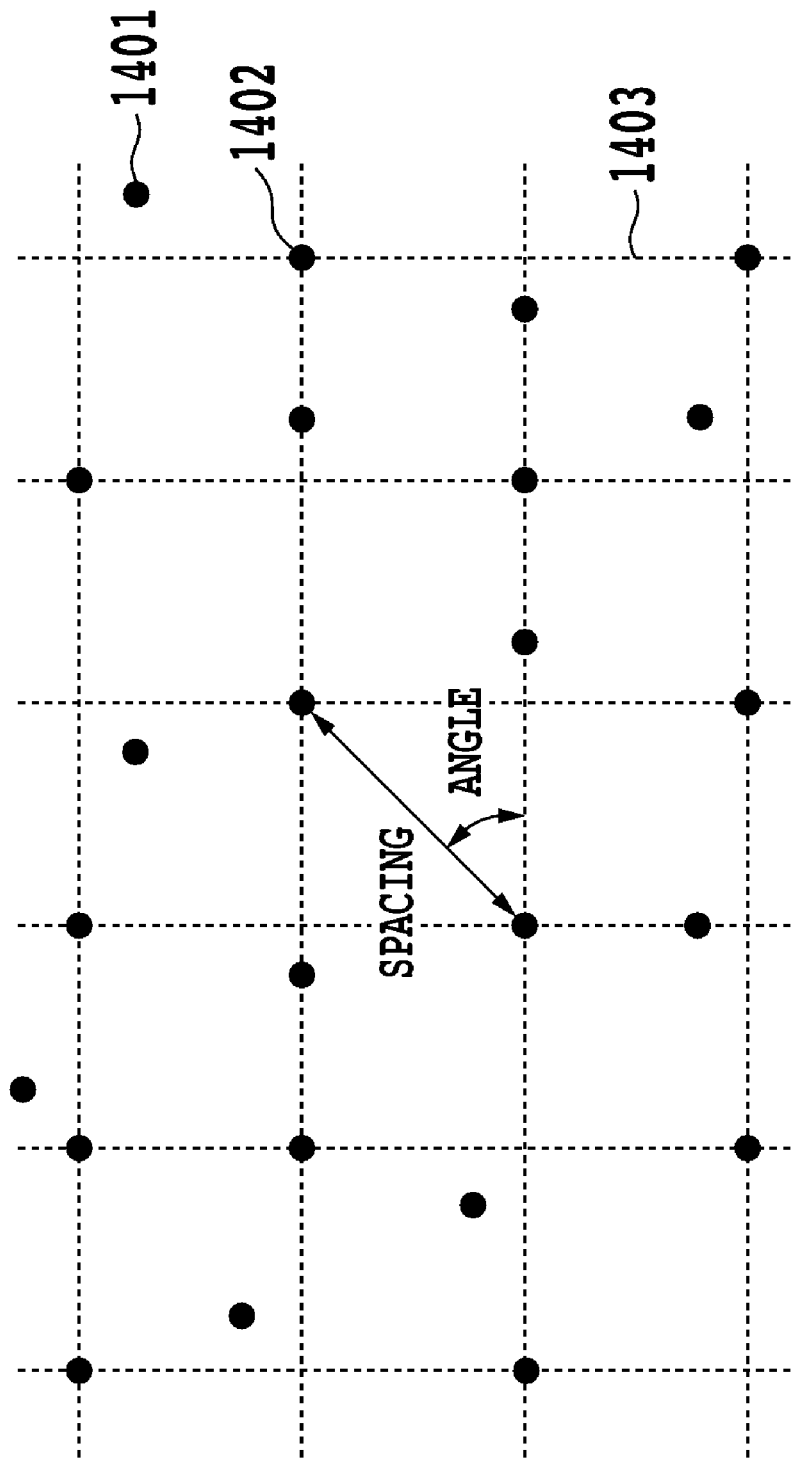
FIG. 3 is a diagram for providing a supplementary description on a unit barcode 1600.

FIG. 3 is a diagram showing what types of dots are contained in the high density region 1605 shown in FIG. 5. The high density region 1605 contains information dots 1401 and arrangement dots 1402. The arrangement dots 1402 are equally spaced on a reference grid 1403 (specifically, on the intersections of reference grid 1403) indicated by dotted lines. The information dots 1401 are present at positions displaced from the reference grid 1403. This displacement direction (direction of the position displaced with respect to the intersection) represents the result of the encoding of the inhibition information. In other words, when the embedded information (the result of the encoding of the inhibition information, which is a part of the embedded information) obtained by encoding the inhibition information is converted into an image, it is possible to form the unit barcode containing the information dots 1401 and the arrangement dots 1402 in the region 1605.

In the other high density regions 1606 to 1608, the same dots obtained by converting the same information into an image with the same method are contained. The reason why the same dots are contained in this way is that redundancy is acquired. Specifically, since part of the unit barcode is hidden and part of the unit barcode is output on the printed document depending on the density of the printed document, the redundancy is acquired by repeating the same dots (information). This is also because, even if part of the barcode is not read, it can be restored from a plurality of fragments in a supplementary manner.

In the low density regions 1609 to 1612, dots obtained by converting, into an image, the embedded information (the result of the encoding of the tracking information, which is apart of the embedded information) obtained by encoding the tracking information are contained. The method of the conversion into an image is the same as the high density regions 1606 to 1608.

In this specification, the processing composed of the following steps is referred to as encoding: (i) the embedded information is obtained by encoding the inhibition information and/or the tracking information; (ii) the unit barcodes are formed by converting this embedded information into an image; and (iii) the unit barcodes are arranged vertically and horizontally (for example, 609 unit barcodes). The encoding is performed by the encode portion 11.

Although, in FIG. 3, the reference grid 1403 is represented by dotted lines, it is actually composed of imaginary lines that are not printed. Hence, how the imaginary lines are found when the printed document is scanned, that is, how information is acquired from the data of the scattered dots when the printed document is scanned will be described with reference to FIG. 9. This processing is performed by the computerizing portion 3.

First, the computerizing portion 3 arbitrarily selects a dot 1501. Then, the computerizing portion 3 arbitrarily selects a dot 1502 around the selected dot 1501. Then, the computerizing portion 3 turns the positions of the selected dots 90 degrees about the center point of the dots. When dots are present at the positions resulting from the turning, the computerizing portion 3 determines that the selected dots are the arrangement dots which are equally spaced vertically and horizontally. On the other hand, when dots are not present, the computerizing portion 3 determines that the selected dots are the information dots which are randomly present. In this way, the computerizing portion 3 finds two arrangement dots, and thereafter finds all the other arrangement dots by utilizing the constraint condition that the arrangement dots are equally spaced vertically and horizontally.

After finding all the arrangement dots, the computerizing portion 3 draws the reference grid on these arrangement dots in an imaginary manner, and finally obtains the embedded information by determining the displacement directions of the remaining dots (that is, the information dots) from the intersections of the reference grid. In this embodiment, when the dot is displaced in an upward direction, 0 is obtained as information; when the dot is displaced in an upper right direction, 1 is obtained as information; when the dot is displaced in a rightward direction, 2 is obtained as information; . . . ; and when the dot is displaced in an upper left direction, 7 is obtained as information.

Figure 6:
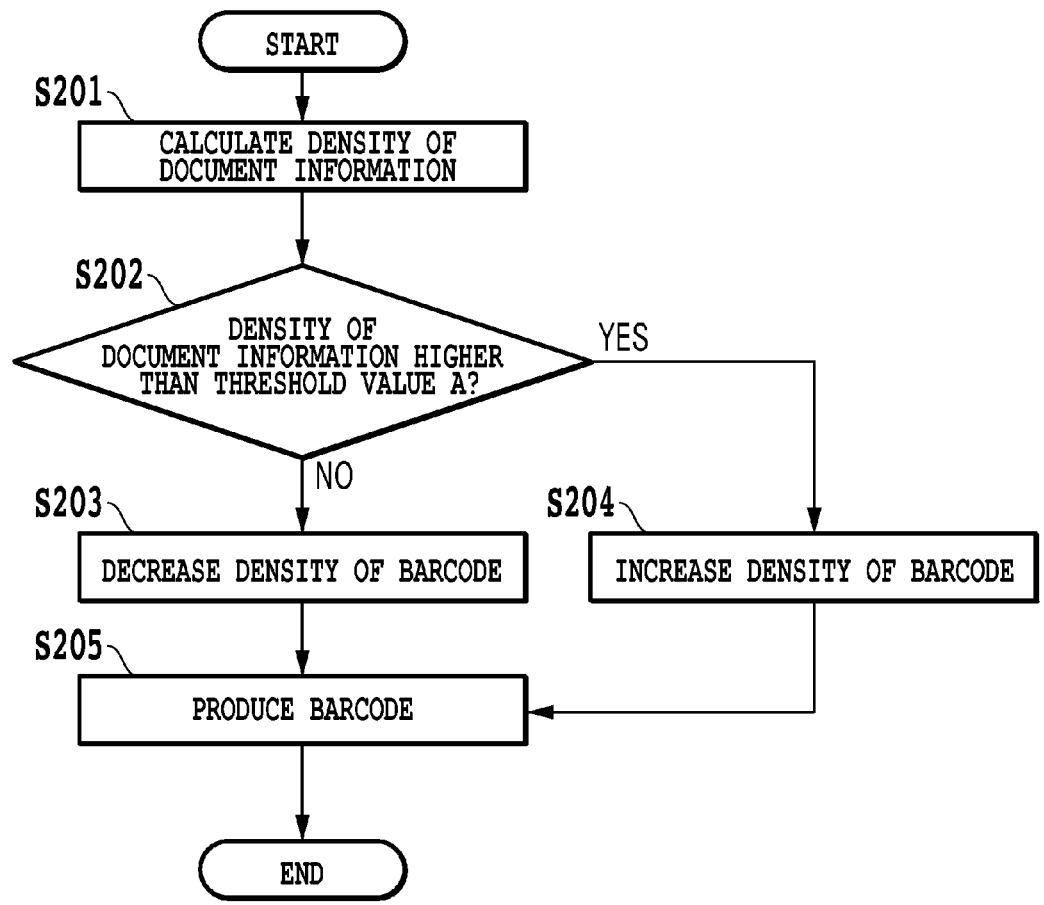
FIG. 6 is a flowchart in the first embodiment.

FIG. 6 is a flowchart showing the flow of the processing of this embodiment. The following flow is a detailed example of step S104 shown in FIG. 2 by the encode portion 11, and describes processing for adjusting (determining), based on the document information, the density of the barcode and saving the amount of toner consumed.

In step S201, the encode portion 11 calculates the density (document information density) of the document information generated by scanning the printed document. Here, in this embodiment, the document information density is defined as a ratio of the number of effective pixels to the number of all pixels in the image information. Here, the effective pixel refers to a pixel in which anything is drawn and its color is not restricted. Specifically, a high document information density indicates that the ratio of the number of effective pixels in the image information is high, and a low document information density indicates that the ratio of the number of effective pixels in the image information is low.

Since the document information stored in the memory 7 employs a bitmap format in which the pixel information constituting the document information is arranged in the shape of a lattice, the number of effective pixels can be obtained by checking the information of each pixel and counting the number of pixels including information that anything is drawn. The number of all pixels can be easily determined by multiplying the number of pixels in a vertical direction by the number of pixels in a horizontal direction in the bit map format. The document information density such as 30% or 80% can be determined from the number of effective pixels and the number of all pixels thus obtained. In other words, the document information density can be an index that shows how much margin is contained in the original printed document. The printed document containing a large amount of margin has a low document information density whereas the printed document containing a small amount of margin has a high document information density.

Then, in step S202, the encode portion 11 determines whether or not the document information density is higher than a threshold value A (first threshold value). The threshold value A may be previously stored in the encode portion 11 as a setting value such as 70%; the user may change it through the operation portion 5. If the document information density is lower than the threshold value A, the process proceeds to step S203 whereas, if it is higher than the threshold value A, the process proceeds to step S204.

If the document information density is lower than the threshold value A, in step S203, the encode portion 11 sets low the density of the barcode specified in step S205 described later. On the other hand, if the document information density is higher than the threshold value A, in step S204, the encode portion 11 sets high the barcode density.

Then, in step S205, the encode portion 11 produces the barcode according to the barcode density determined in step S203 or step S209. In the present invention, the barcode density is defined as a setting value for determining the distance between the information dot 1401 and the arrangement dot 1902 (for convenience, hereinafter referred collectively to as "dots"). If the set barcode density is high, the distance between the dots is reduced whereas, if the set barcode density is low, the distance is widened.

In FIGS. 7A and 7B, examples of outputs at different barcode densities are shown. FIG. 7A shows an output at a high barcode density; FIG. 7B shows an output at a low barcode density. FIGS. 7A and 7B show that, when the barcode density is changed, the number of dots per unit area is changed, and that, when the barcode density is high, the amount of toner consumed at the time of printing is increased, whereas, when the barcode density is low, the amount of toner is decreased.

Incidentally, even if an attempt is made to scan, with the read portion 2, the printed document where the barcode is embedded and to obtain the embedded information with the computerizing portion 3, it can always be possible that dots cannot be selected. This is because part (in some cases, most) of the dots within the barcode overlaps the drawn content of the printed document, it cannot be recognized as dots, with the result that dots cannot be selected. The barcode is repeatedly embedded over the entire printed document so that information is obtained from the recognized dots. Since increasing the number of dots per unit area increases the possibility of obtaining information, in terms of inhibition of leakage of confidential information, it is preferable to always set the barcode density high. However, when a large amount of margin is contained in the document information, or the drawn content is relatively low in size, it is possible to read information without increasing the barcode density, and consequently toner and the like is wasted. If the document information density is low, the barcode density is decreased in step S203; this is because the waste of the toner and the like is eliminated.

On the other hand, when the document information density is high, that is, when, in the printed document, a small amount of margin is contained in the image information, the barcode density is normally set high in order to increase the possibility of achieving the reading. In other words, step S204 simply indicates that, as compared with step S203, the barcode density is high, and it is not always necessary to set the density higher than the normal barcode density. By changing the barcode density according to the document information density in this way, irrespective of whether the document information density is high or not, it is possible not only to maintain the accuracy of reading information in the MFP 3001 but also to reduce the amount of toner and the like when the printing output is performed.

Although, in this embodiment, the distance between the dots is widened according to the setting value of the barcode density, and thus the amount of toner necessary per page is reduced, the size of the dot may be reduced instead. When the dot is made somewhat large, even if the dot overlaps the drawn content of the image information, the dot may be larger than it or the dot may be not completely covered by the drawn content, with the result that the possibility of achieving the reading with the read portion 2 is increased. However, as in the case of using the distance between the dots, when a large amount of margin is contained, or the drawn content is relatively low in size, since it is unnecessary to increase the size of the dot, it is possible to save, when the document information density is low, the toner by decreasing the size of the dot. Furthermore, it is possible to adjust both the distance between the dots and the size of the dot according to the setting value of the barcode density.

Embodiment 2

A second embodiment of the present invention will be described in detail below with reference to the accompanying drawings.

The first embodiment deals with the method in which, while the accuracy of reading the embedded (synthesized) barcode is acquired, the density of the barcode is changed according to the document information density, and thus the amount of toner and the like consumed is saved. However, when the document information density is extremely high, for example, when the document information has a photographic image arranged over the entire page and has almost no margin, even if the barcode is added, the MFP hardly reads the barcode, which is disadvantageous. Accordingly, the second embodiment of present invention deals with a component that is configured to stop its output when the document information density is extremely high.

Figure 8:
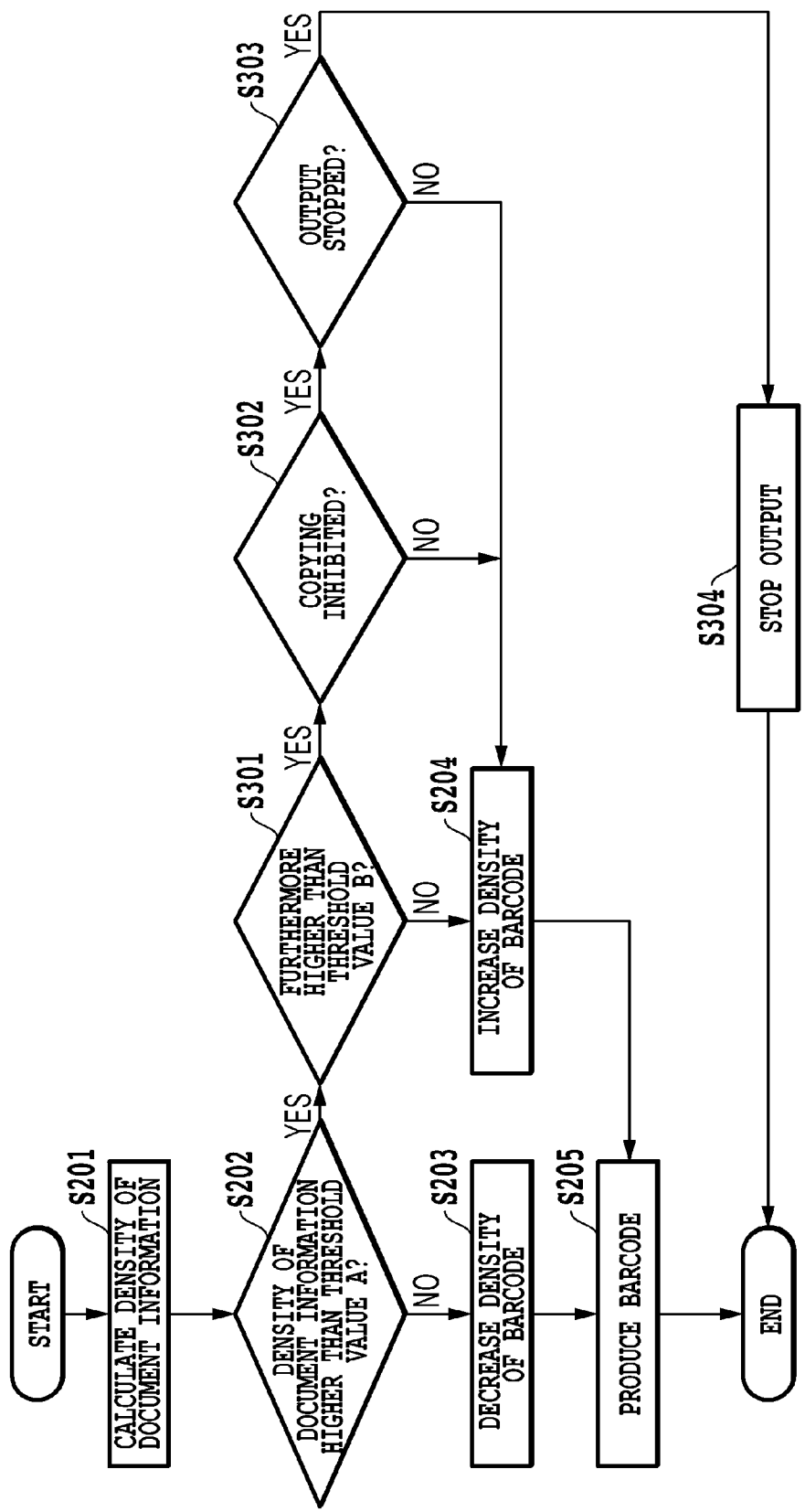
FIG. 8 is a flowchart in a second embodiment.

FIG. 8 is a flowchart showing the flow of processing that is performed in this embodiment. It only differs from the first embodiment in that steps S301 to S304 are added. Steps S201 to S205 are the same as in the first embodiment, and thus only steps S301 to S304 will be described below.

In step S301, the encode portion 11 determines whether or not the document information density is higher than a threshold value B (second threshold); if the document information density is higher than the threshold value B, the process proceeds to step S302 whereas, if it is not, the process proceeds to step S204. Here, the threshold value B is a threshold value that is set higher than the threshold value A in step S202; it indicates that the density of the document information is high such that, even if the barcode density is increased, the barcode embedded in the printed document may not be read by MFP 3001. For example, if the threshold value A in step S202 is 70%, a value of 90% is selected as the threshold value B. This threshold value B is previously set by the user, and is stored in the memory 7. The document information density may exceed the threshold value B if, as described above, the document information having a photographic image arranged over the entire page is input.

Figure 4:
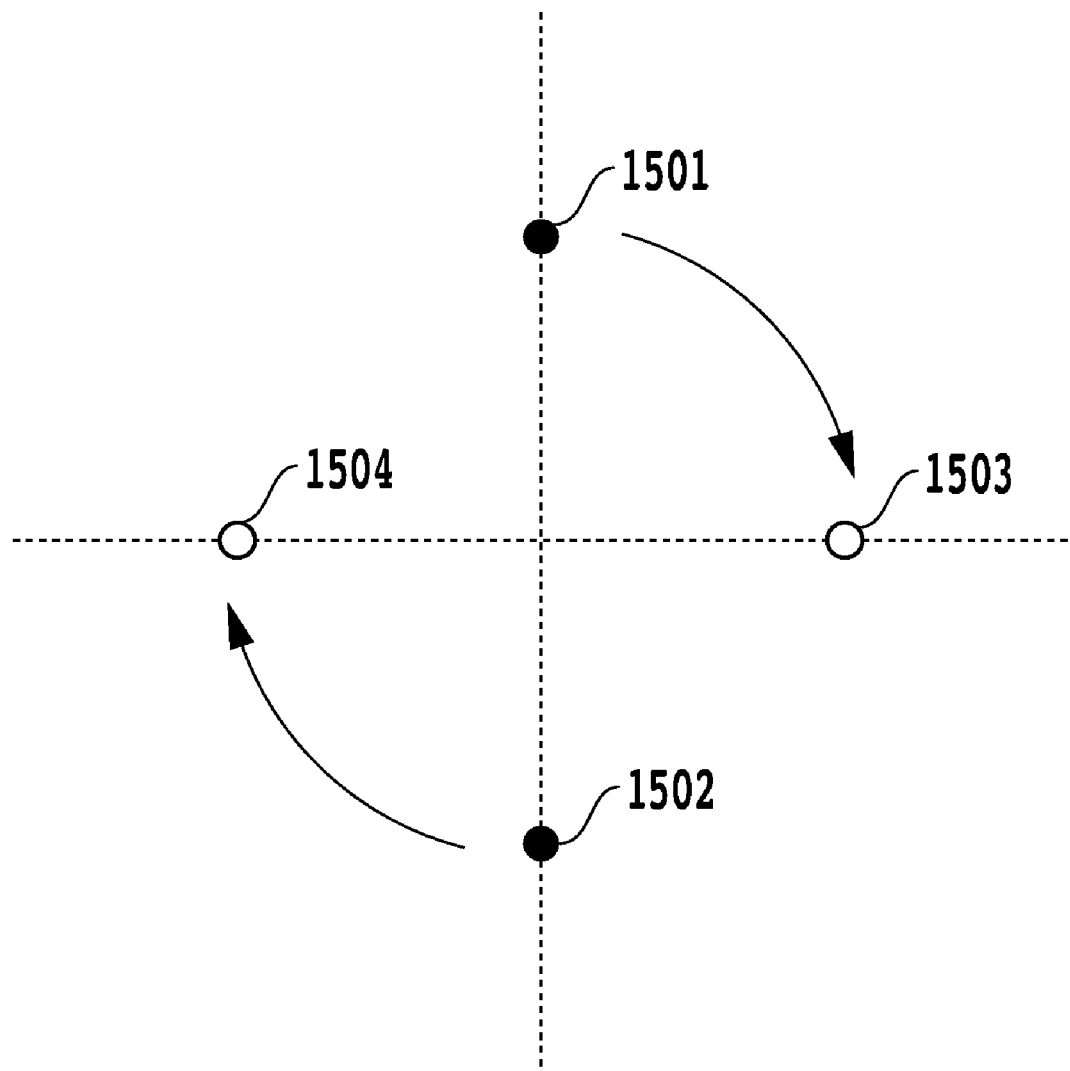
FIG. 4 is a diagram for describing the correction of the angle of rotation of a grid.

Then, in step S302, the encode portion 11 determines whether or not the inhibition information to be output is a piece of information for instructing to inhibit copying; if it is, the process proceeds to step S303 whereas, if it is not, the process proceeds to step S204. Here, it is assumed that there are two types of information indicated by the inhibition information, namely, information for inhibiting copying and information for permitting copying. If the inhibition information is the information for inhibiting copying, it is necessary to ensure that the barcode indicating such information is reliably read by MFP 3001. Thus, if the inhibition information indicates that copying is inhibited, the process proceeds to step S303 where the output is inhibited. On the other hand, if the inhibition information indicates that copying is permitted, the output is continued because the possibility that the barcode cannot be read, that is, that the instruction to inhibit copying cannot be read and thus the printed document is copied is permissible. If the inhibition information indicates, as described above, that copying is permitted, the process thereafter may proceed to step S204 where the encode portion 11 increases the barcode density, and proceed to step S205 where the barcode is produced. Alternatively, since the possibility that, even if the barcode is synthesized, it can be read by the MFP 3001 is low, in order to save the toner and the like, it may be possible to complete the processing without the production of the barcode in steps S204 and S205 (not shown). In this case, even if the process returns to the processing in step S104 of FIG. 2, the processing in step S105 for synthesizing the image information with the barcode may be skipped. The information indicating that copying is inhibited and the information indicating that copying is permitted can be distinguished by, for example, changing the value (value of any of 0 to 7) indicating displacement of the information dots shown in FIG. 4 to change the information.

The permission of copying contains conditional permission information. The conditional permission information is a type of information with which to permit copying for a specific user and inhibit copying for users other than the specific user. For example, in the example of FIG. 5, the regions 1605 to 1608 contain the conditional permission information as the inhibition information; the user ID contained in the regions 1609 to 1612 as the tracking information is the "condition". The conditional permission information and the permission information are recognized by the on-line sensor portion 4. If the condition of the conditional permission information is not satisfied, that is, if a user other than the specific user attempts to perform copying, the printing output is stopped (not shown). In this case, since the printing output itself is stopped and thus the processing is completed, the processing in steps S105 and S106 after the processing in step S104 shown in FIG. 2 is not performed.

Figure 9:
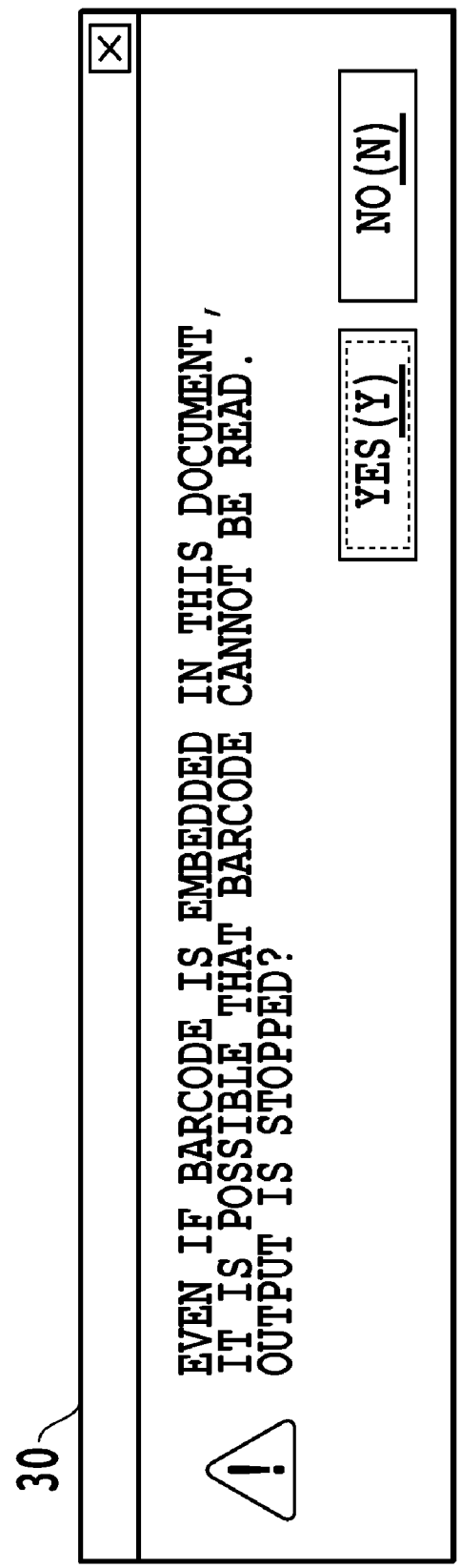
FIG. 9 is a diagram showing an example of a user interface.

Then, with reference back to FIG. 8, in step S303, through the control portion 1, the encode portion 11 makes the operation portion 5 display a user interface 30 so that the user performs input to determine whether or not the output is stopped. In FIG. 9, an example of the user interface 30 is shown. If the user performs input (selects "yes") to stop the output, since an instruction to stop the output is notified to the encode portion 11 through the control portion 1, the process proceeds to step S304 where the encode portion 11 stops the output. In this case, since the printing output itself is stopped and thus the processing is completed, the processing in steps S105 and S106 after the processing in step S104 shown in FIG. 2 is not performed. On the other hand, if the user selectively performs input (selects "no") in the user interface 30 shown in FIG. 9 to continue the output, the process proceeds to step S204 where the encode portion 11 continues the output.

The processing in steps S301 to S304 described above is performed and thereby the printing output is stopped when the barcode may not be read by the MFP, and consequently it is possible to inhibit the leakage of confidential information. In a mode other than the mode in which copying is inhibited, the output is continued, and the user is made to perform input to determine whether or not the output is stopped; in this way, it is possible to improve the convenience of the user. Although the above description deals with the case where the barcode using the information dots is employed, another barcode using a two-dimensional barcode or an electronic watermark may be employed.

Although the above description deals with the case where the processing from the input of the image information up to the synthesis of the barcode with the image information is performed in the MFP 3001, part or all of the processing may be performed by a driver or a utility in a PC connected to the MFP 3001. In this case, part or all of the individual portions shown in FIG. 1 can be provided in the PC.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-126664, filed May 26, 2009, which is hereby incorporated by reference herein in its entirety.

What is claimed is:

1. A device comprising:

a setting component configured to set a density of a barcode;

a synthesizing component configured to synthesize, with document information, the barcode having a density set by the setting component; and an outputting component configured to output an image synthesized by the synthesizing component, wherein, when a density of the document information is higher than a first threshold value, the setting component increases the density of the barcode, and when the density of the document information is lower than the first threshold value, the setting component decreases the density of the barcode, and wherein at least part of the barcode is printed at a position that overlaps a position at which content printed based on the document information is printed.

2. The device of claim 1, further comprising:

a control component, wherein, in a case that the density of the document information is higher than a second threshold value, wherein the second threshold value is higher than the first threshold value, the control component is configured to stop output of the document information when information included in the barcode indicates an instruction to inhibit copying, and the control component is configured to not stop output of the document information when information included in the barcode indicates an instruction to permit copying.

3. A method comprising the steps of:

setting a density of a barcode;

synthesizing, with document information, the barcode having a density set by the setting step; and outputting an image synthesized in the step of synthesizing the barcode, wherein, when a density of the document information is higher than a first threshold value, the step of setting the density increases the density of the barcode, and when the density of the document information is lower than the first threshold value, the step of setting the density decreases the density of the barcode, and wherein at least part of the barcode is printed at a position that overlaps a position at which content printed based on the document information is printed.

4. The method of claim 3, further comprising:

a control step, wherein in a case that the density of the document information is higher than a second threshold value, wherein the second threshold value is higher than the first threshold value, the control step stops output of the document information when information included in the barcode indicates an instruction to inhibit copying, and the control step does not stop output of the document information when information included in the barcode indicates an instruction to permit copying.

5. A program stored in a non-transitory computer-readable storage medium, the program causing a computer to perform the method of claim 3.

* * * * *